United States Patent [19]

Warkentin

[11] Patent Number: 4,524,780
[45] Date of Patent: Jun. 25, 1985

[54] COMBINE ATTACHMENT FOR HARVESTING RADISH SEEDS AND THE LIKE

[75] Inventor: Henry Warkentin, Lebanon, Oreg.

[73] Assignee: Agriculture Service Corporation, Salem, Oreg.

[21] Appl. No.: 533,122

[22] Filed: Sep. 19, 1983

[51] Int. Cl.³ .................... A01F 12/10; A01F 11/04; A01D 45/00
[52] U.S. Cl. ................... 130/30 G; 56/14.4; 56/126; 56/364
[58] Field of Search ............. 56/DIG. 1, 14.3, 14.4, 56/14.6, 364, 126; 130/30 G

[56] References Cited

U.S. PATENT DOCUMENTS

| | | | |
|---|---|---|---|
| 2,196,645 | 4/1940 | Saiberlich | 56/364 |
| 2,282,868 | 5/1942 | Innes | 56/364 |
| 2,521,999 | 9/1950 | Scott | 56/DIG. 1 |
| 2,570,065 | 10/1951 | Melroe | 56/364 |
| 3,474,605 | 10/1969 | Resetich | 56/364 |
| 3,505,796 | 4/1970 | Halls et al. | 56/DIG. 1 |
| 3,513,646 | 5/1970 | Johnston et al. | 130/30 G |
| 3,552,398 | 1/1971 | Looker | 130/30 G |
| 3,581,747 | 6/1971 | Scribner | 56/DIG. 1 |
| 3,722,190 | 3/1973 | Fisher | 56/DIG. 1 |
| 3,945,178 | 3/1976 | Delfosse et al. | 56/14.6 |
| 4,035,991 | 7/1977 | Oosterling et al. | 56/DIG. 1 |
| 4,279,261 | 7/1981 | Satake | 130/30 G |

*Primary Examiner*—Paul J. Hirsch
*Attorney, Agent, or Firm*—Klarquist, Sparkman, Campbell, Leigh & Whinston

[57] ABSTRACT

A combine attachment for harvesting radish seeds and the like includes a fixed lower harvesting roll and an upper roll spaced vertically therefrom and mounted for spring-biased movement toward and away from the lower roll. The rolls are spaced a distance sufficient of split seed-containing pods, but not so close as to crush the seeds. The upper and lower rolls are carried by a frame mounted to a forward portion of the combine rearward of a pick-up belt and forward of an auger. The frame is detachably mounted to the frame by fastening means for easy attachment to and detachment from the frame. The split pods are conveyed to a thresher which separates the seeds from the preconditioned pods.

11 Claims, 6 Drawing Figures

COMBINE ATTACHMENT FOR HARVESTING RADISH SEEDS AND THE LIKE

The present invention relates generally to agricultural equipment, and more particularly to apparatus for harvesting radish seeds and the like.

BACKGROUND OF THE INVENTION

Radish sprouts, like other varieties of sprouts, are becoming an increasingly popular food item. Radish sprouts are highly nutritious and, for example, may be used as a condiment for salads. Radish sprouts are grown from radish seeds which mature into edible seedlings.

It is most difficult to harvest automatically radish seeds from mature radish plants because the plants produce the seeds in a hard pod or shell. This is especially true of the Diakon variety, a desirable variety of radish which produces a particularly hard pod.

There are mainly two reasons for this difficulty. First, the radish pods containing the seeds have no natural fracture line, like many other seed-containing pods, such as beans and peas. Second, it is critical that the seed itself not be damaged during the harvesting process. Even a hairline crack in a harvested radish seed results in an unattractive, and therefore undesirable, black ring on the cotyledon leaf of a radish seedling grown from the seed. From a commercial standpoint, it is highly desirable to limit defective seeds to 2% or less of the total number of seeds harvested. In any event, a harvested crop having more than 5% defective seeds is unacceptable.

Conventional harvesting combines are ineffective in harvesting radish seed. Such combines typically include a wide pick-up conveyor at its forward end to pick-up the radish windrow, followed by an auger which breaks up the cut radish plants comprising the windrow and moves the same to a feeder conveyor. The feeder conveyor conveys the seed-containing plants to a thresher having a thresher bar and concave closely surrounding the thresher bar. The thresher bar rubs the radish plants against the concave to separate the chaff from the remainder.

The thresher generally falls into one of two types. The most conventional type has a wide cylindrical threshing mechanism that is belt or chain driven. Alternatively, the thresher may have one or more longitudinal rotors that extend much of the length of the combine. The latter type is sometimes referred to as an "axial flow" or "rotor" type thresher. While both such threshing mechanisms adequately separate the seed-containing radish pods from the chaff, they are of little, if any, use in separating the seeds from the pods.

One modification of a conventional combine that has met with some success in harvesting radish seed is the use of rubber-coated "flax rolls" to split open the radish pods before they enter the thresher, thereby to enable the thresher to separate the exposed seeds from the pods. The term "flax rolls" comes from the traditional use of similar rolls to abrasively remove flax seed from harvested flax. One of the rolls is typically spring mounted for biased movement toward and away from the other roll. Also, one of the rolls typically is adjustable to vary the spacing between the rolls. The so-called flax rolls are mounted within the housing of the feeder conveyor, which is relatively narrow, just forward of the thresher.

This modification has several disadvantages. The rolls are hidden from the view of the combine operator, who has no way of knowing when jamming or other problems requiring attention occur. Moreover, the flow rate of the radish pods through the flax rolls, as determined by the feeder conveyor, necessarily must be relatively slow, or otherwise the rolls will not split the pods adequately. The rolls are also poorly accessible, making them difficult and time-consuming to adjust, remove, inspect and install. This problem is particularly troublesome for farmers who frequently use their combines for different applications, some of which require that the rolls be removed. Finally, any given set of rolls generally will fit only the particular feeder housing for which it was designed, making such rolls costly to manufacture and expensive to farmers who must purchase new rolls every time they buy a different combine model.

Accordingly, there is a need for a combine attachment that facilitates the harvesting of virtually defect-free radish seeds at a high rate, and can be universally mounted to most combines in a visible, easily accessible manner.

It is therefore one object of the invention to provide a combine attachment for harvesting radish seed or the like capable of harvesting virtually defect-free radish seed at a high rate.

Another object of the invention is to provide a combine attachment, as aforesaid, that can be universally mounted to most combines.

Still another object of the invention is to provide a combine attachment, as aforesaid, that is visible to the operator so that the harvesting of seeds can be continuously monitored and adjustments made when necessary.

Yet another object of the invention is to provide a combine attachment, as aforesaid, that is easily accessible for repair and adjustment, and easily and quickly mounted to and detached from the combine.

A further object of the invention is to improve the quality of harvested radish seeds or the like.

The foregoing and other objects, features and advantages of the invention will become more readily apparent from the following detailed description which proceeds with reference to the accompanying drawings.

SUMMARY OF THE INVENTION

In accordance with the foregoing objects, the present invention comprises a combine attachment for harvesting radish seeds or the like. It includes a frame and fastening means for detachably securing the frame to a forward portion of the combine. A pair of upper and lower transverse rolls are carried by the frame. The frame mounts to the combine such that the rolls are disposed just rearwardly of a pick-up belt of the combine and forward of a feeder conveyor. The rolls are spaced vertically a distance sufficient to split seed-containing pods conveyed between the rolls without crushing the seeds. The pods are then conveyed to a thresher which shakes loose the radish seeds from the preconditioned pods.

BRIEF DESCRIPTION OF THE DRAWINGS

FIG. 4 is a side elevation taken along line 4—4 of FIG. 3.

FIG. 5 is a side elevation taken along line 5—5 of FIG. 3.

FIG. 6 is a cross section taken along line 6—6 of FIG. 3.

DETAILED DESCRIPTION OF THE DRAWINGS

Figure 1:
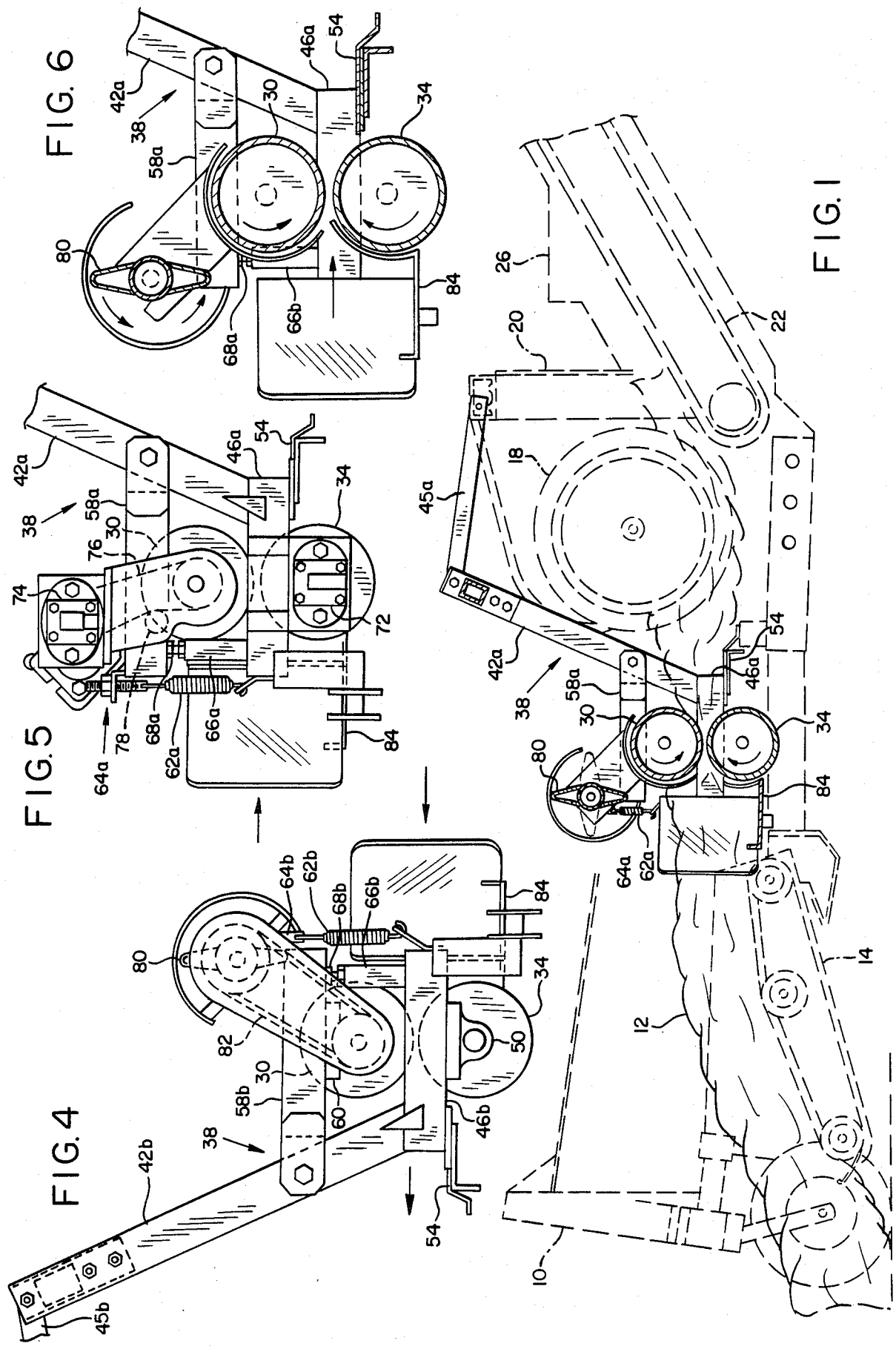
FIG. 1 is a side elevation of a forward portion of a harvesting combine showing a combine attachment in accordance with the present invention.

Referring particularly to FIG. 1, a combine used to harvest a crop windrow 12 containing radish seeds or the like includes a pick-up frame 10, pick-up belt 14, auger 18, header platform 20, feeder conveyor 22 and feeder housing 26. Feeder conveyor 22 feeds the cut radish plants to a thresher (not shown), where the seeds are separated from the remaining chaff.

Positioned between pick-up belt 14 and auger 18 is the attachment comprising the present invention which includes a pair of transversely extending, vertically-spaced rolls, an upper roll 30 and lower roll 34. Upper roll 30 and lower roll 34 are carried by a frame 38 that is detachably fastened to the combine by fastening means (not shown). The attachment is positioned just forward of auger 18 and rearward of pick-up belt 14 in an easily accessible and visible location.

Figure 2:
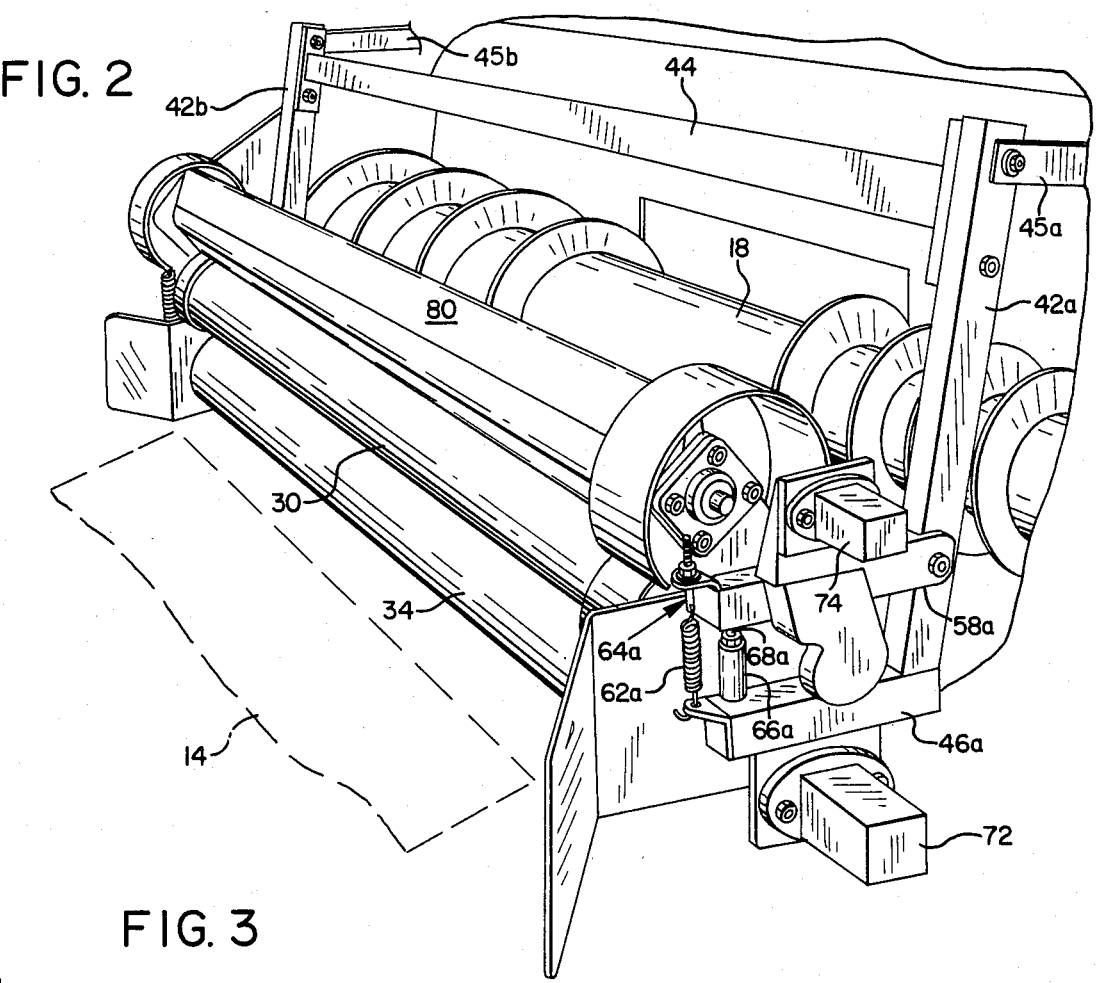
FIG. 2 is a perspective view of the invention of FIG. 1 with a pick-up conveyor forward thereof removed.
Figure 3:
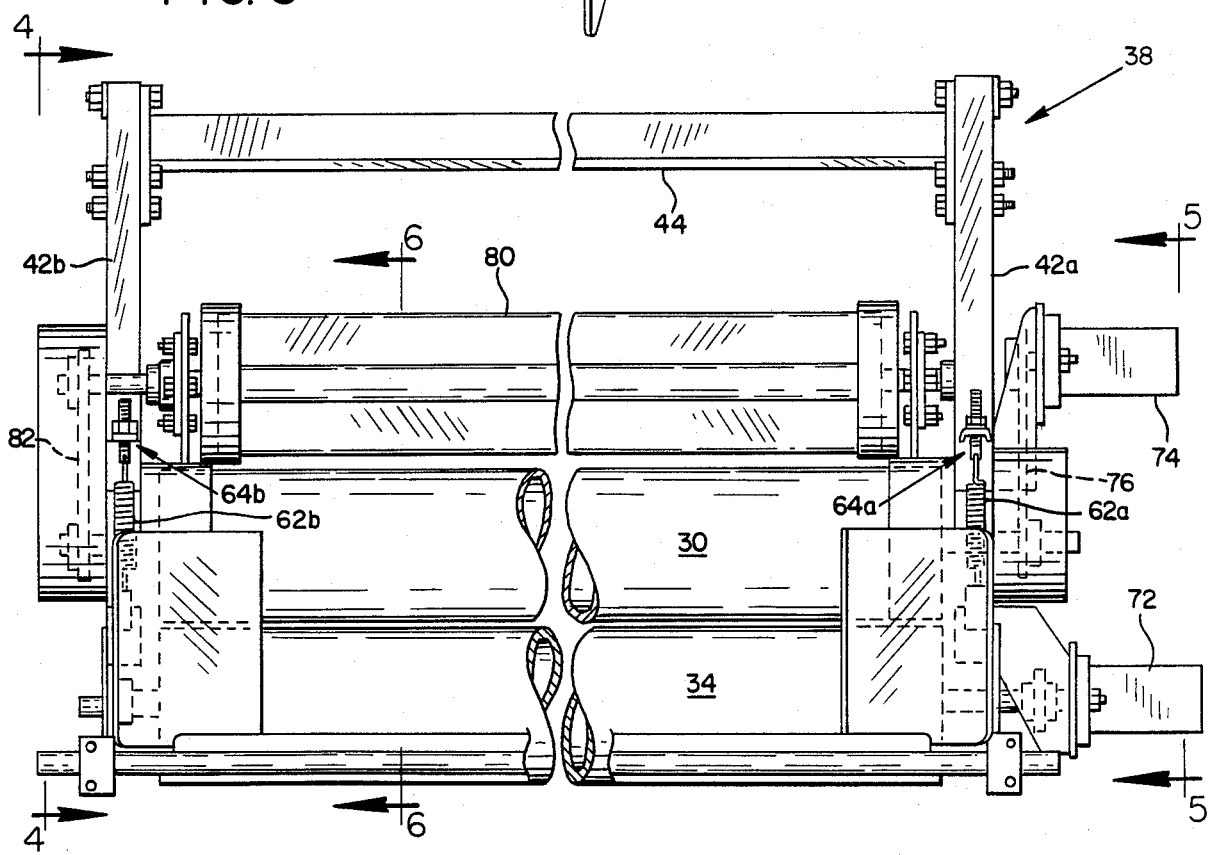
FIG. 3 is a front elevation of the invention, also with the pick-up conveyor removed.

Frame 38 includes a pair of substantially vertical columns 42a,b interconnected by a cross support 44 (FIGS. 2 and 3). Braces 45a,b connect columns 42a,b to header platform 20 (FIG. 1) to rigidly support the frame when it is attached to the combine. A pair of lower support arms 46a,b, are secured, such as by welding, to a lower portion of columns 42a,b, respectively, and carry bearing means 50 (FIG. 4) at their respective mid-sections for supporting the opposite ends of the lower roll, while allowing the same to rotate about a fixed axis. The support arms are detachably fastened by fastening means (not shown) to an outfeed deck 54 (FIGS. 4 and 5) upon which the arms rest further to support the attachment.

Upper roll 30 is mounted to the frame by resilient support means for biased movement toward and away from the lower roll. The resilient support means includes a pair of upper support arms 58a,b and a pair of springs 62a,b associated with the support arms. Support arms 58a,b are pivotally connected at one end to columns 42a,b, respectively, and carry bearing means 60 (FIG. 4) at their respective mid-sections for supporting the opposite ends of the upper roll. Spring 62a is connected at one end to a tension adjusting means 64a (FIGS. 2, 5) attached to support arm 58a and at its other end to fixed support arm 46a. Similarly, spring 62b is connected at one end to a tension adjusting means 64b (FIGS. 3, 4) attached to support arm 58b and at its other end to fixed support arm 46b. Thus, while the upper roll is free to pivot away from the lower roll, springs 62a and 62b acting through support arms 58a and 58b urge the upper roll towards the lower roll.

In a preferred form of the invention, the resilient support means comprises a hydraulic tension means in place of springs 62a,b. The hydraulic tension means includes, for example, a pair of hydraulic cylinders (not shown) and an air or nitrogen charged accumulator that taps off of the hydraulic line upstream of a "T" junction joining such cylinders. The hydraulic tension means permits virtually infinite automatic adjustment of the tension acting on upper roll 30, and therefore virtually infinite adjustment of the splitting pressure applied to the seed-containing pods. The operator can adjust the tension from the cab by controlling the oil in the accumulator and monitoring changes in pressure with a pressure gauge using conventional equipment and controls.

In this way, accurate control of the splitting pressure applied to the seed-containing pods is maintained. This is important because the yield and quality of the harvested seeds is quite sensitive to the applied splitting pressure. Excessive pressure will damage too many seeds and insufficient pressure will decrease the yield by failing to sufficiently precondition many of the pods for later threshing. The preferred splitting pressure is a function of the type and condition of the pods being split. For example, with some varieties of seeds it may be desirable to apply less pressure to the pods when they are soft and damp than when they are hard and dry, and vice versa with other varieties.

Referring particularly to FIGS. 4-6, the minimum vertical spacing between the upper and lower rolls is determined by a roll adjustment means including a pair of threaded collars 66a, 66b and mating bolts 68a, 68b underlying support arms 58a, 58b, respectively, to support the same. The bolts 68a, 68b are adjusted in their respective collars such that the spacing between the upper and lower rolls is slightly less than the thickness of the average radish seed pod passing between the rolls, thereby to split or crimp the pods as they pass therethrough, but great enough to avoid crushing the radish seeds contained within the pods.

The upper and lower rolls are driven by a fluid drive means in a counter-rotating manner, as illustrated by the arrows in FIGS. 1 and 6, to convey the harvested radish plants between the rolls and towards the auger. The fluid drive means comprises a fluid motor 72 which directly drives a center shaft of the lower roll, and a fluid motor 74 which drives a center shaft of the upper roll through a drive chain 76. Chain 76 is kept under steady tension by an idler 78 (FIG. 5) that permits motor 76 continuously to drive the upper roll as it moves toward and away from the lower roll. Motors 72, 76 are in fluid communication with a hydraulic pump (not shown) and source of hydraulic fluid located at the rear of the combine. The speed of the rolls can therefore be independently adjusted.

A roll reversing means is provided to permit the rolls to be reversed from the direction shown in FIGS. 1 and 6 when jamming occurs. The roll reversing means comprises a closed loop hydraulic circuit with motors 72 and 74 (fixed or variable displacement) in series at one end and a variable displacement hydrostatic pump (not shown) such as the model PPV 248 manufactured by Cessna and distributed by Spencer Fluid Power, Portland, Oregon, at the other end of the circuit. The operator controls the reversing function by a conventional mechanical remote control.

As the harvested radish plants are fed between the rolls, a rotatable beater means disposed above and slightly forward of the upper roll urges stray portions of the windrow downwardly towards a path of travel between the rolls. The rotatable beater means comprises a beater reel 80 carried by the frame and driven by the upper roll through drive belt 82 (FIG. 4).

In operation, the combine is driven by a tractor means along a path in line with a crop windrow containing radish seeds or the like. The windrow is picked up by the pick-up belt and conveyed to the upper and lower rolls, after crossing an infeed deck 84. The counter-rotating rolls feed the harvested plants therebetween, thereby to precondition the pods by crimping the same. The transverse span of the rolls is as wide as the radish windrow itself to enable the windrow to be fed at a high flow rate between the rolls with minimal jamming.

The rolls exert a substantially uniform crimping pressure upon the radish pods, even in the presence of "lumps", by virtue of the upper roll which is free to pivot away from the lower roll and the resilient support means which urges the upper roll to return to the "minimum spacing" position. The rolls also have a vulcanized rubber coating that further serves to facilitate the application of a uniform pressure upon the radish pods and to insure that the seeds contained therein will not be crushed.

The auger receives the crimped pods and accompanying chaff from the rolls and funnels the same to the feeder conveyor, which conveys the same to the thresher. As the windrow is threshed, the radish seeds separate from their associated pods and the remaining chaff by falling through openings or cracks in the preconditioned, crimped pods. Very few of the collected seeds are damaged. Samples of harvested seeds using the present invention are well within the commercially preferred range of less than 2% defective seeds.

Moreover, the location of the rolls forward of the feeder conveyor permits the operator to view the same for potential problems. In the event the rolls become plugged, the problem immediately becomes apparent to the operator, who can reverse the direction of the rolls by reversing the hydrostatic pump, without leaving the cab. This eliminates the risk of injury caused by an operator trying to unplug the rolls when in gear. The rolls are also easily accessible for repair, maintenance or detachment from the combine. An operator who frequently must remove and reattach the attachment to use the combine for different applications can easily do so with a minimum amount of down time and effort.

Equally important, the attachment mounts to a portion of the combine that is generally uniform from one combine to the next, namely, the outfeed deck just forward of the auger. Thus, the cost of manufacture of the attachment, and therefore the cost to the purchaser, is significantly less than that of existing equipment.

Having illustrated and described the principles of our invention in a preferred embodiment and variations thereof, it sould be apparent to those skilled in the art that the invention may be modified in arrangement and detail without departing from the principles thereof. We claim as our invention all modifications coming within the scope and spirit of the following claims.

We claim:

1. In a harvesting combine having a pick-up belt, an auger downstream of the pick-up belt, a feeder conveyor downstream of the auger and a threshing means downstream of the feeder conveyor, an attachment mountable to a forward portion of the combine to facilitate the harvesting of radish seeds or the like from a crop windrow having seed-containing pods comprising:
   a frame;
   fastening means for detachably securing the frame to the combine between the pick-up belt and auger;
   a pair of upper and lower transverse hulling rolls carried by the frame and spaced vertically a distance sufficient to split seed-containing pods conveyed between the rolls without crushing the seeds; and
   fluid drive means for driving the rolls in a counter-rotating manner such that the rolls receive all the material comprising the crop windrow from the pick-up belt, convey all of such material therebetween to effect splitting of the pods and then feed all of such material to the auger for conveyance downstream to the feeder conveyor and thence to the threshing means, where the seeds are separated from the split pods.

2. The attachment of claim 1 wherein the rolls have a vulcanized rubber coating to facilitate the application of a uniform pressure on the pods as they pass between the rolls.

3. The attachment of claim 2 including resilient support means for supporting one of the rolls for biased movement toward and away from the other roll, thereby to facilitate the application of a uniform pressure on the pods as they pass between the rolls.

4. The attachment of claim 2 including roll adjustment means for adjusting the minimum spacing between the rolls.

5. The attachment of claim 4 including resilient support means for supporting one of the rolls for biased movement toward and away from the other roll, thereby to facilitate the application of a uniform pressure on the pods as they pass between the rolls.

6. The attachment of claim 5 wherein the lower roll is fixedly mounted to the frame, the resilient support means including pivotally-mounted support arms which support opposite ends of the upper roll for movement toward and away from the lower roll, the roll adjustment means including adjustable screw means bearing against the underside of the support arms.

7. The attachment of claim 6 including rotatable beater means above the upper roll for urging stray portions of the windrow downwardly to a path of travel between the upper and lower rolls.

8. The attachment of claim 1 including roll reversing means for reversing the direction of the rolls when jamming occurs.

9. The attachment of claim 3 wherein the resilient support means supports the upper roll and includes hydraulic tension means for applying a force to the upper roll to resist the movement of the upper roll away from the lower roll.

10. The attachment of claim 9 including means for varying the force applied to the upper roll.

11. An apparatus for harvesting radish seeds or the like from a crop windrow having seed-containing pods comprising:
    tractor means for driving the apparatus along the path of the windrow;
    threshing means for threshing the seed-containing windrow to separate the seeds from their pods and the remaining chaff;
    feeder means forward of the threshing means for conveying the windrow to the threshing means;
    auger means forward of the feeder means for breaking up the windrow and funneling the same toward the feeder means;
    pick-up means forward of the auger means for picking up the windrow and conveying the same toward the auger means; and
    pod-splitting means between the pick-up means and auger means for receiving the pod-containing windrow from the pick-up means, splitting the pods along a fracture line to expose the seeds contained therein, and directing the split pods and remaining material comprising the crop windrow toward the threshing means where the seeds are separated from the pods and remaining material;

the pod-splitting means including upper and lower, transverse rolls, one above the other, having substantially the same width as the pick-up means, the rolls being spaced apart a distance slightly less than the thickness of the seed-containing pods to split the pods conveyed therebetween without damaging the seeds.

* * * * *